US007743082B2

(12) United States Patent
Arcuri et al.

(10) Patent No.: US 7,743,082 B2
(45) Date of Patent: *Jun. 22, 2010

(54) WEB SERVER DOCUMENT LIBRARY

(75) Inventors: Michael P. Arcuri, Seattle, WA (US); Michael Joseph Morton, Seattle, WA (US); Jon Franklin Matousek, Redmond, WA (US); Sam Sengupta, Kirkland, WA (US); James Dulfer, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/174,265

(22) Filed: Jul. 1, 2005

(65) Prior Publication Data

US 2005/0267917 A1 Dec. 1, 2005

Related U.S. Application Data

(63) Continuation of application No. 09/602,818, filed on Jun. 23, 2000, now Pat. No. 6,915,299.

(51) Int. Cl.
*G06F 17/30* (2006.01)

(52) U.S. Cl. ....................................... 707/822; 707/823
(58) Field of Classification Search .................. 707/10, 707/104.1, 101, 102, 100
See application file for complete search history.

(56) References Cited

U.S. PATENT DOCUMENTS

| 4,503,499 | A | * | 3/1985 | Mason et al. ............... 718/101 |
| 5,299,123 | A | | 3/1994 | Wang |
| 5,566,349 | A | | 10/1996 | Trout |
| 5,890,147 | A | * | 3/1999 | Peltonen et al. ................. 707/1 |
| 6,308,179 | B1 | * | 10/2001 | Petersen et al. ............. 707/102 |

* cited by examiner

*Primary Examiner*—Charles Rones
*Assistant Examiner*—Fariborz Khoshnoodi
(74) *Attorney, Agent, or Firm*—Workman Nydegger

(57) ABSTRACT

Document libraries that facilitate content contribution to and management of a website. In general, a document library comprises a database, a special "document library" file system folder and the documents in that folder (or within subfolders of that folder). The database maintains properties of documents in the document library file system folder, and is used to dynamically update views of the document library file system folder and views of properties of the documents. Each document folder is a folder in which content of a specified type may be read and saved.

17 Claims, 8 Drawing Sheets

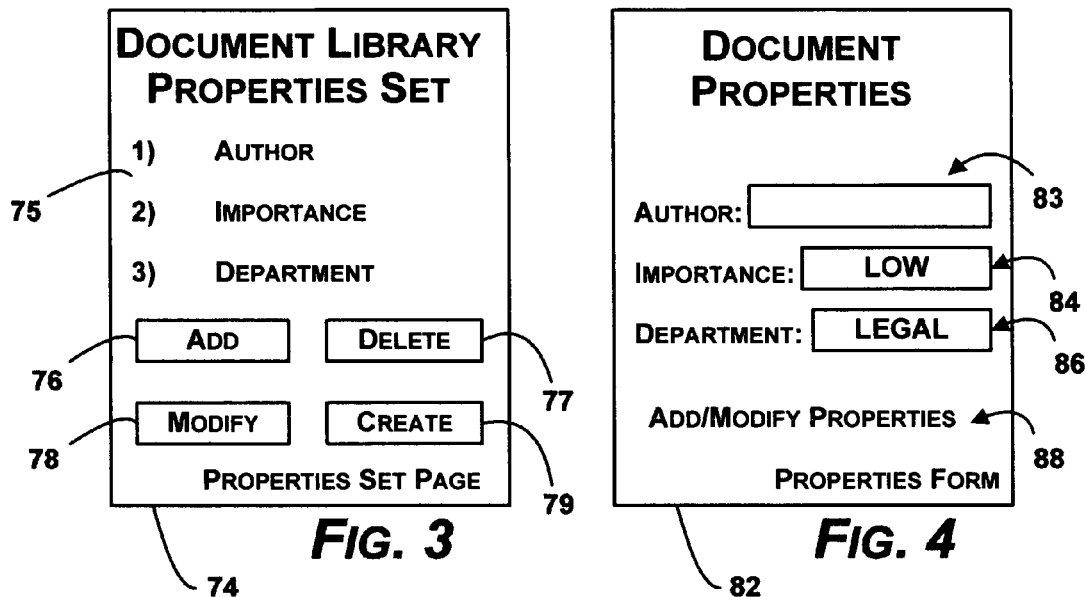
FIG. 3
FIG. 4
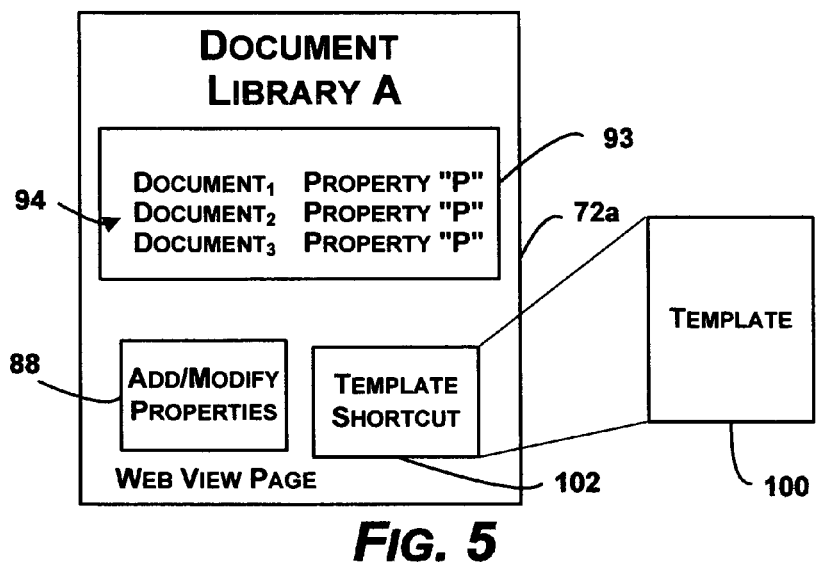
FIG. 5

WEB SERVER DOCUMENT LIBRARY

CROSS-REFERENCE TO RELATED APPLICATION

This is a continuation of U.S. patent application Ser. No. 09/602,818 filed Jun. 23, 2000.

FIELD OF THE INVENTION

The present invention generally relates to computer systems, and more particularly to the storage of documents and/or content of a website.

BACKGROUND OF THE INVENTION

Many contemporary companies utilize websites (e.g., corporate intranets or the like) to make company information, documents, and other content accessible to multiple users. A well organized website permits multiple authors to contribute and edit content, and provides a mechanism through which the content is made widely available.

Website content may be saved in a variety of places within an ordinary file system folder hierarchy. Often, a website is arranged so that a content contributor may elect a location within the file system folder hierarchy for saving content. The folder hierarchy may be confusing to a user, making it difficult for the user to know where to save contributed or edited content in the file system.

After saving a document, a document contributor, if given permission to do so, often edits the home page and/or sub-pages of a website to add links to the new document. The user may not understand the hierarchy of the website, which is often very different from the hierarchy of the file system folders, and may place links to the document in the wrong place, or may not place any links to the document at all. Other users will thus not be aware of the existence of, or may not be able to find, the new document. To help the contributor, or if the contributor is not allowed to place links in the website, a website administrator may place links to the document in the correct page or pages of the website. However, such administrators may not be able to timely maintain documents placed on the website, and thus become a bottleneck to efficient management of documents on the website. However, the use of an administrator is often preferred because the administrator may not want a number of users to be able to edit the home page or other pages of the web site, because the web site structure may be compromised.

If a user does not understand how to access documents on a website, or if the website is not properly maintained, the user may not be able to find a particular document. Although searching mechanisms (e.g., full text) may be used, the search mechanisms are often not appropriate for sites having a large number of documents, for example, because users generally type in too few words to effectively limit the search, and thus receive an unworkable number of matches. In addition, a search is generally only effective if the user is looking for a known file. Often, the user may not know of a file, but if a web site were properly maintained, the user may be able to successfully browse through the structure of the web site to find relevant files.

SUMMARY OF THE INVENTION

Briefly, the present invention facilitates content contribution to (and management of) a website through the use of document libraries. In general, a document library includes a database, a special "document library" file system folder, and the documents in that folder (or within subfolders of that folder). The database maintains properties of documents in the document library file system folder, and is used to dynamically update views of the document library file system folder and views of the documents themselves. Each document library folder is a folder in which content of a specified type may be read and saved. For example, one document library file system folder may contain a certain department's written specifications, another may contain the department's published whitepapers, another may contain the department's schedules, and so forth.

Each document library has its own set of properties associated therewith that are applicable to the specific kind of documents that the document library contains, and the properties become part of the metadata for the documents of that document library. The properties are maintained in the database, and the set of properties corresponding to a document library may be added to, deleted from, or modified (e.g., set with default values). To locate a document, the database may be queried (e.g., through a view page) to quickly locate documents with properties matching the query, e.g., via sort and/or filtering operations. Also associated with each document library is a template for that document library, via which new documents may be created, and a form via which properties values for each new document may be entered. The form may have default values for some or all of the properties, and some of the properties may be mandatory (i.e., requiring data), while others are optional.

A view page enables the contents of document library file system folders to be viewed. More particularly, a web view page may be constructed by binding a section of the web view page with a particular document library, or by binding the web view page with a query that is directed to the document library and that specifies documents having one or more defined properties. A web view page displays links to documents meeting the defined properties. The links on the web view page may be sorted by one or more of the properties, and one or more properties of the document may also be displayed.

Via network access software (e.g., a browser), a new document may be created or an existing document may be edited through links in the document library view. Alternatively, an editing program such as Microsoft Word may create or edit a document. In any event, when saving a document to a document library file system folder, the website server reads the form associated with each document in a document library to extract the properties of the document, saves the properties to the database, and saves the document (along with its properties) to the document library file system folder on the file system. Alternatively, the properties may be saved in the document, and then when the document is saved to the server, the properties are extracted and saved to the database. Because the document library web view page is bound to the database, the newly saved document automatically becomes viewable via the document library web view page.

Properties may be set for a document in a variety of ways, e.g., via the form associated with the document library. Saving a document to a particular folder may associate the document with a particular document library, and thus may define property fields for the document. Alternatively, a document may be "saved" to a document library via a "Save" or "Save As" user interface that displays representations of document libraries. Selecting a particular document library causes the document to be saved to the folder associated with the designated document library, and associates the property set of the document library with the document. Some of these properties may have default values, and other properties values may be entered or selected (e.g., from form fields) by a user. Properties may also be set or modified for a document while editing the document (e.g., in an application such as Microsoft Word), or when viewing the document via network access software.

Other advantages will become apparent from the following detailed description when taken in conjunction with the drawings, in which:

BRIEF DESCRIPTION OF THE DRAWINGS

FIG. 3 is a representation of a properties set page for document libraries in accordance with one aspect of the present invention;

FIG. 4 is a representation of a properties form for setting properties values for a document stored in an exemplary document library in accordance with one aspect of the present invention;

FIG. 5 is a representation of a web view page for use with a document library in accordance with one aspect of the present invention;

DETAILED DESCRIPTION

Exemplary Operating Environment

Figure 1:
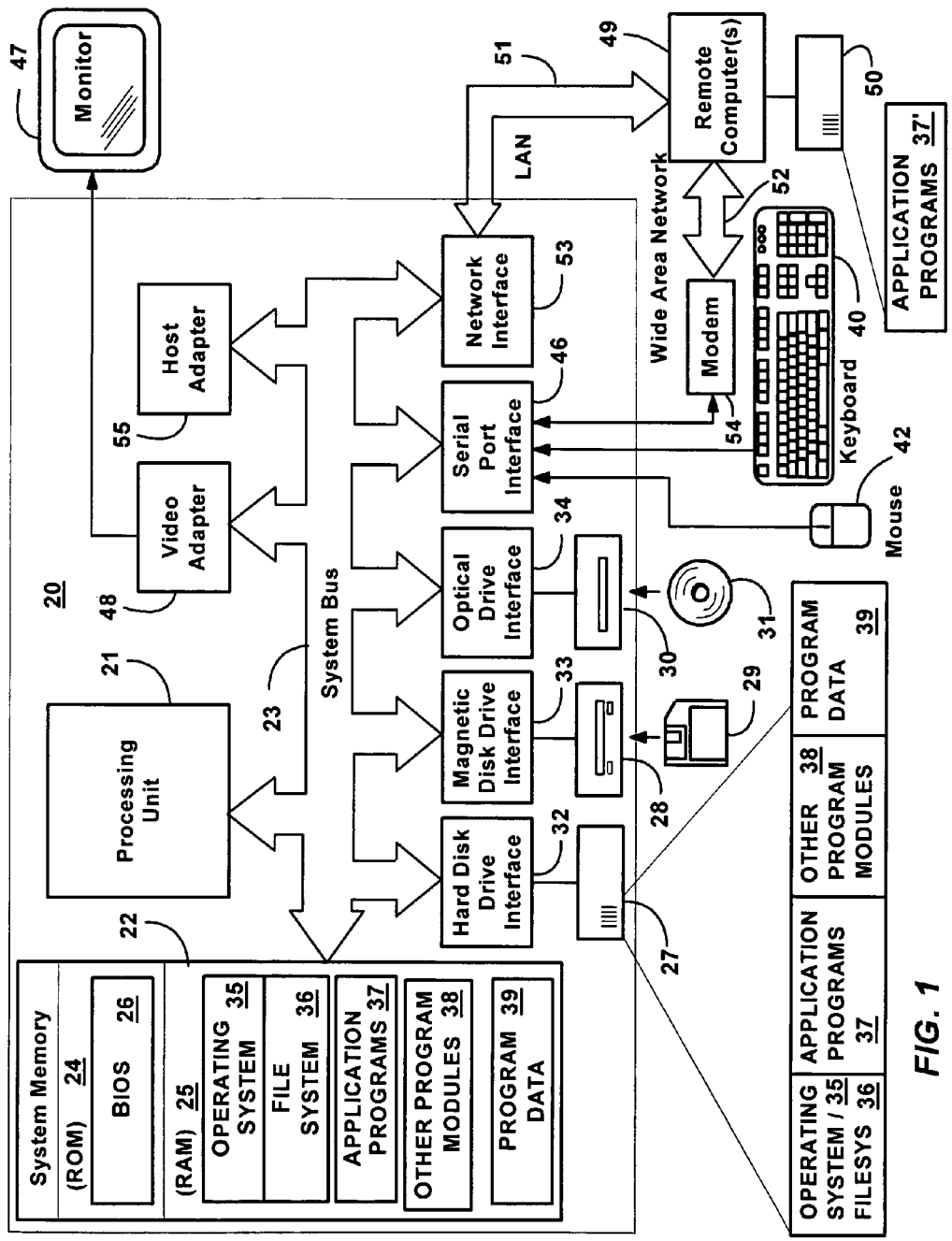
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system 36 therein and/or associated therewith), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention may have particular application to a hand-held device, such as a pocket PC. In its most basic configuration, a hand-held device typically includes a processing unit 21 and read-only memory (ROM) 24 and/or random access memory (RAM) 25. Additionally, the hand-held device may also have mass storage (removable and/or non-removable) such as magnetic or optical disks or tape, described above. Similarly, the hand-held device may also have input devices such as described above and/or output devices such as a display. Other aspects of a hand-held device may include network connections to other devices, computers, networks, servers, etc. using either wired or wireless media, such as described above.

Web Server Document Library

Figure 2:
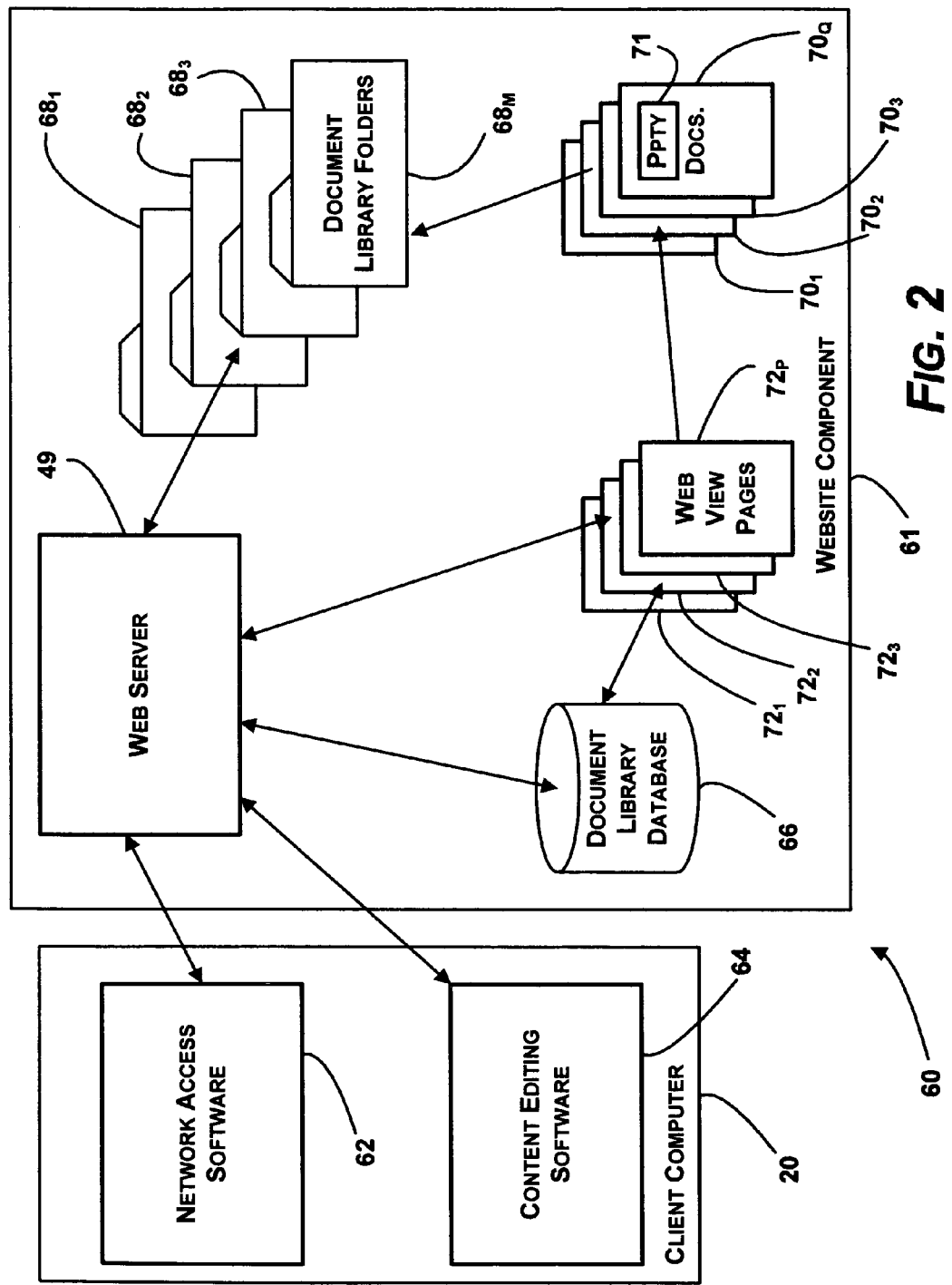
FIG. 2 is a block diagram representing a general architecture for a computer system in which document libraries of the present invention may be utilized.

FIG. 2 shows a general architecture of a computer system 60 in which the present invention may be implemented. Briefly, the computer system 60 includes a client computer (e.g., the personal computer system 20) and a website component 61 including a web server (e.g., the remote computer 49). Although the functions and components of the client machine 20 and the web server 49 are described as being located within two separate computers, the components of these two computers or the functions performed thereby may be provided on one machine, or may be distributed over a number of computers.

The client computer 20 includes software for accessing content (e.g., web pages or documents) available from the website component 61. This software may be in the form of network access software 62 (e.g., a browser) and/or content editing software 64 (e.g., a word processing program such as Microsoft Word®). One or both of these software components may be provided, or their functions may be provided, in one software program.

The website component 61 includes (or, alternatively, is associated with) one or more document libraries. In general, as is described further below, a document library comprises a document library database 66, a document library file system folder 68, and documents 70 in the document library file system folder (or within subfolders of the document library file system folder). As used herein, a "document" is referred to broadly to mean a file that is produced by an application or any other content, such as image files and XML files and the like, that can be saved to a website.

The website component 61 preferably includes a plurality of document library file system folders $68_1$-$68_M$, wherein each document library file system folder 68 is a folder on the file system 36 in which content of a specified type may be read and saved. The document library file system folder 68 may include subfolders. For example, one document library file system folder 68 may contain a certain department's written specifications, another may contain the department's published whitepapers, another may contain the department's schedules, and so forth. Subfolders may be present, e.g., the department's schedules may be contained in different subfolders of the same document library file system folder 68.

One or more web view pages $72_1$-$72_P$ are accessible via the web server 49. As is described further below, the web view pages 72 utilize the properties of the documents to create views of documents (i.e., provide links to the documents on the web view page).

Each document library preferably has its own set of properties. The properties are preferably any type of meta-information that may be associated with a document, e.g., meta-information such as state of a document, expire-time, workflow assignment, arbitrary groupings made by disjoint collections of documents, and the like. The set of properties for the document library are relevant to the type of documents it contains. Each document in a document library may have no value or a valid value for each of the properties in its containing document library's property set. The values for each of the properties for a particular document make up the document's properties values set 71. Only one properties values set 71 is shown in FIG. 2, but each document preferably includes its own properties value set. As is described further below, to facilitate searching and categorization, it is better that each document in a document library have values set meaningfully. The properties values set 71 for a document is preferably maintained with other document metadata, but may be associated with the document in another manner.

For example, if the document library contains documents related to motor specifications for a brand of cars, the properties for that document library may include the motor type, the author of the specification, the years in which the motor was sold, the displacement of the engine, and the like. A particular properties value set for a document may include the specific motor type, author, year(s), and displacement for a particular motor. As another example, another document library may include photos, and the set of properties for that document library may be the photographer, the date the photo was taken, the resolution of photo, the general subject (e.g., trip to China), or the like. The values for each of the properties for a particular photo make up the properties values set 71 for the photo.

In one embodiment of the present invention, a particular document library does not have a specially-defined property set. The document library serves, for example, as a "Shared Documents" library for a small website, where contributors place all the documents they want to share. In this case, the documents may all be viewed via a particular web view page. In addition, if wanted, the documents may be searched for or sorted via built-in properties like author, title, filename, creation date, etc.

The properties set for a document library may be defined as desired by the creator of a document library. In addition, the properties set corresponding to a document library may be added to, deleted from, or modified by a user having authorization. To this end, a document library may have associated therewith a properties set page 74 (FIG. 3). The properties set page 74 includes a list 75 of properties for the document library, and provides a manner in which to create or modify the properties set, e.g., via "add," "delete," "modify," and "create new" buttons 76, 77, 78 and 79. The properties page 78 and/or the add, delete, and modify buttons 76, 77, 78 and 79 may not be available to a user that does not have authorization to modify the document library's property set. Access to the properties set page 74 may be provided on interfaces for the content editing software 64 or the network access software 62, or may be provided from other locations accessible via the website component 61.

Properties values may be set for a document in a variety of ways, including manual setting of the properties by a user, or programmatic setting by action occurring on the document (e.g., saving of the document). In addition, property values may change as a result of a change in the "state" (e.g., expire-time, work-flow assignment, arbitrary groupings made by disjoint collections of documents, and the like) of a particular bit of meta-information for the document.

In accordance with one aspect of the present invention, properties values may be set via a properties form 82 (FIG. 4). The properties form 82 preferably includes a field for each property in the property set of the document library, is preferably automatically generated based on the results of a query of the document library database to obtain the schema (i.e., property set information) of the document library. In this manner, when the property set for a document library is changed, the properties form is automatically updated.

Access to the properties form 82 may be provided as desired by a designer of a website, but as examples, may be accessed while editing the document via a link in the user interface of the content editing software 64, or when viewing the document via a link in the user interface of the network access software. The properties form 82 includes fields, e.g. the fields 83, 84, 86, each of which represents one of the properties in the property set for the respective document library. A properties form may be designed so that some property fields are mandatory (e.g., require data), while others may be optional. The completed fields define the properties values of the respective document. One or more of the fields 83, 84, 86 on the properties page may be set to a default value. For example, a time stamp may set a "date last revised" property. Saving a document to a particular file folder may associate the document with a particular document library, and thus may set one or more property fields to a default. For example, the documents within one folder may all include a default department (e.g., accounting) in a "departments" field. This default field may be set to "accounting" when a document is created or is saved to a document library associated with the accounting department.

Fields that are not filled by default may be completed by a user, and default fields may be changed (or may be fixed). One or more of the fields in the property set may be form fields that require selection from a field of options. For example, the Importance field 84 may include the following form field options: Low, Medium, and High.

In the example shown in FIG. 4, the fields 83, 84, and 86 are Author, Importance, and Department, respectively. A properties page for a different document library file system folder may include one or some of the same fields, additional fields, or an entirely different set of one or more fields. A link 88 may be provided to the properties set page 74 (FIG. 3).

Properties values for a document may be set or changed as desired. For example, a user may be prompted to set the properties values for a document at creation or saving of the document in a word processing program. After creating or editing a document 70, if the document is not associated with a document library file system folder 68, then the user may be prompted to select a document library from a list shown via a dialog box, page, or the like. For example, a document 70 may be "saved" to a document library via a "Save" or "Save As" user interface that displays representations of document libraries. Selecting a particular document library causes the document 70 to be saved to the document library file folder 68 associated with the designated document library, and sets the properties set for the document, permitting properties values to be entered as appropriate. As described above, some of the values for the properties may be set by default, and other properties may be entered (e.g., by typing an entry) or selected (e.g., from form fields) by a user. The properties form 82 may be presented to the user so that the properties values may be entered or selected for the document.

If a new property is added to a property set by a user (e.g., via the properties set page 74), the user may have to set values for the new property for the documents already in the respective document library. Alternatively, some of the properties may be set by default for the documents in the document library, or may be set for each of the documents the next time document is accessed or saved.

The properties values set 71 is saved as part of the document, for example as metadata for the document. Alternatively, the properties value set 71 may be associated with the document in another way, e.g., maintained in a database. For example, the properties value set 71 may be maintained exclusively in the document library database 66. However, maintaining the properties value set 71 in metadata for the document permits a document to be copied to another machine or web server without losing the properties value set.

Figure 6:
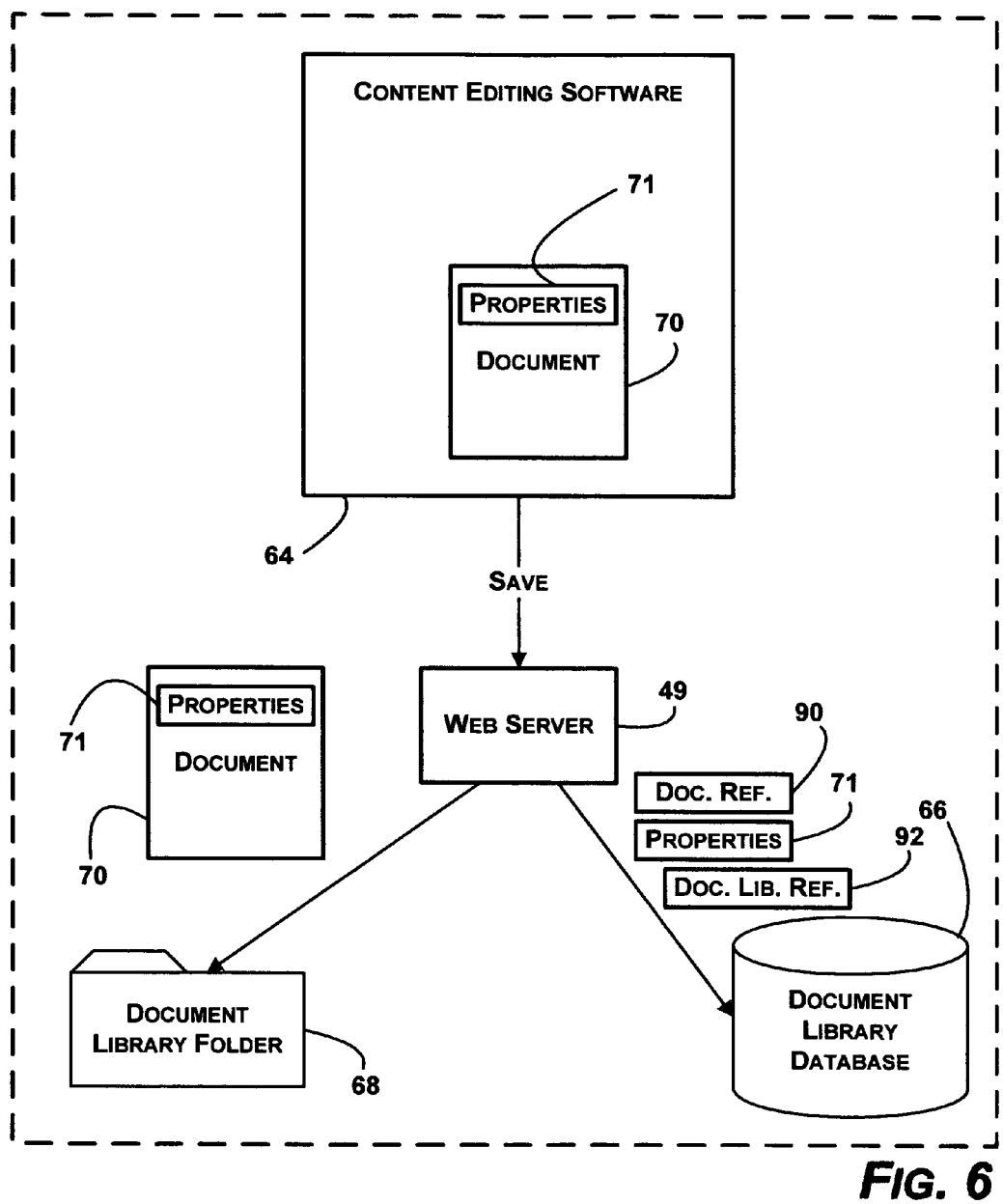
FIG. 6 is a block diagram representing a process of saving a document to a document library in accordance with one aspect of the present invention.

As generally shown in FIG. 6, when a document 70 is saved to a document library, an event is triggered to the web server 49, which causes the web server to read the metadata properties out of the newly saved document and promote them to the database. The property value set 71 is saved to the document library database 66, along with information 90 regarding the document, such as a URL or the like, and information 92 regarding the document library with which the document is associated.

The web view pages 72 may be used to access the documents 70 that are maintained in the website component 61. The web view pages 72 described herein are, for example, HTML (Hypertext Markup Language) pages. HTML-created pages permit easy embedding of hyperlinks to web-based URLs or local references, and editing by a designer or a user. Note, however, there is no intention to limit the present invention to HTML, as virtually any page format language, e.g., XML (Extensible Markup Language) or DHTML (Dynamic HTML) or other page creation mechanism will suffice.

The web view pages 72 preferably provide links to one or more documents available on the web site based upon the information available in the document library database 66. More particularly, a web view page 72 may be constructed by binding a portion of the web view page with a query directed to the document library database 66. As is described further below, the document library database 66 is accessed by the web view pages 72 so as to dynamically update links to documents 70 meeting the requested or queried properties.

The document library database 66 may be accessed by a web view page 72, for example, to provide a view on the web view page of documents 70 that are contained within a particular document library file system folder 68. This structure is advantageous, because when a document is saved to a particular document library file system folder, the document automatically becomes viewable on the web page view associated with the document library. The user and/or an administrator does not have to manually add a link to the page.

As another example, the document library database 66 may be queried to provide a view of documents having similar properties values, such as documents written by a certain author. Again, this feature provides an advantage in that once a particular property or properties are set for a document, that document will automatically be displayed on a particular web view page. Thus, a contributor does not have to add links to the document within the website.

Figure 7:
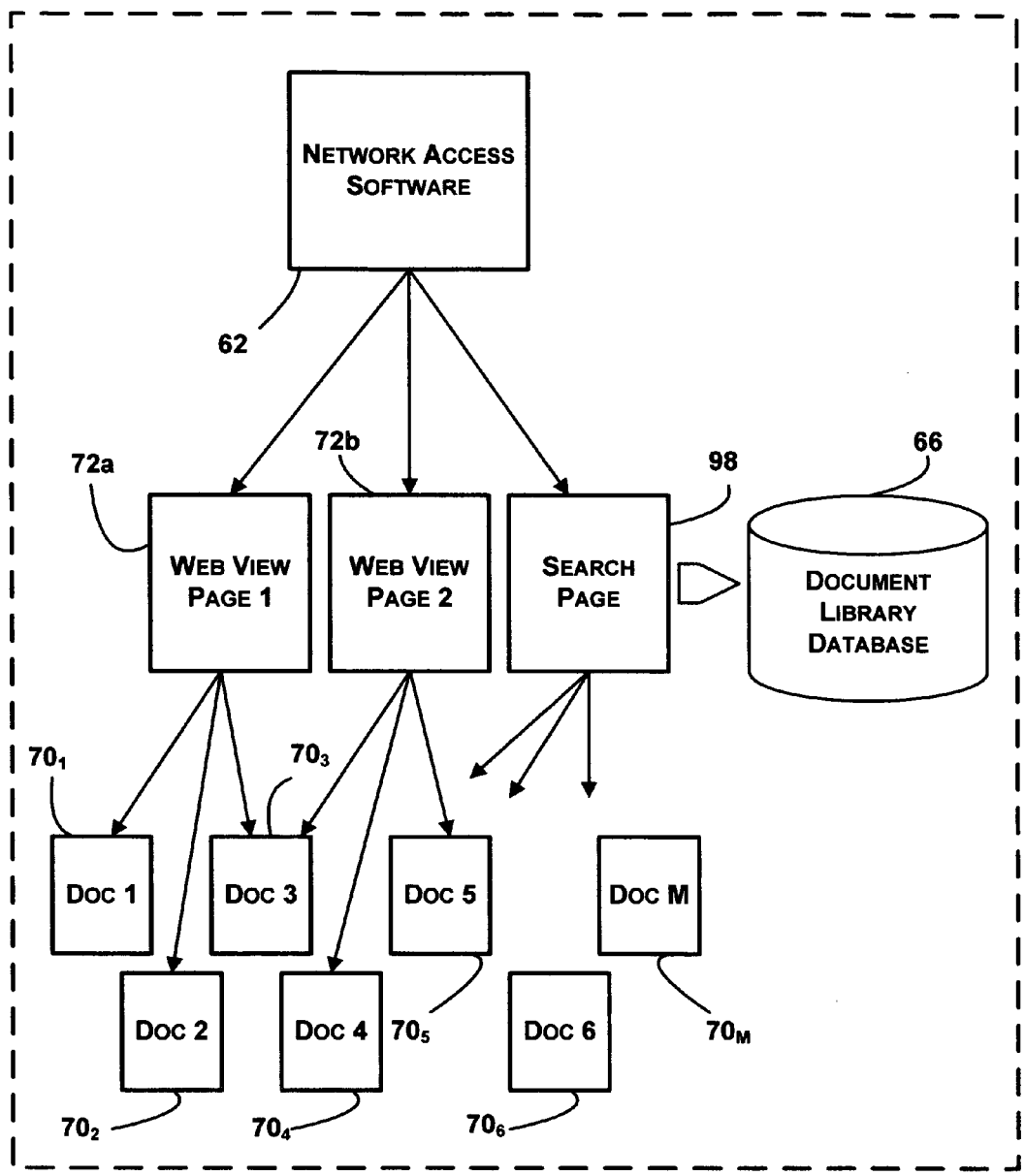
FIG. 7 is a block diagram representing the formation of view pages and a search page in accordance with an aspect of the present invention.

FIG. 5 shows a web view page 72a having a section 93 that is data bound to a query with the document library database 66 (FIG. 7). In the example shown in FIG. 5, the query is directed to documents in a particular document library "A." When the web view page 72a is accessed (e.g., via the network access software 62), the document library database 66 is accessed by the web view page 72a to determine documents that are in the document library "A," e.g., by using the information 92 regarding the document library with which the document is associated. The document library database 66, in return, provides information regarding the documents in the document library "A," e.g., by using the information 90 regarding the documents, whereby document links 94, 95, 96 are displayed in the section 93 of the web page view 72a. The links may be provided as icons, words, pictures, or combinations thereof, in a manner such as is known in the art. Because the section 93 is bound to a query instead of having fixed links, documents that are added or deleted from the document library "A" are dynamically added to or deleted from the section 93.

Information other than the documents in a document library may be shown on a web view page 72. For example, a section of a web view page 72b (FIG. 7—detail not shown) may be bound with a query that specifies documents having one or more defined properties. The documents may be located in the same document library, or may be distributed over more than one document library. As an example, one query may be directed to all documents having the author "John Doe." The query may retrieve documents from two or more different document libraries.

The links to a document 70 on a web view page 72 may be sorted by one or more of the properties (e.g., date last modified). In addition, the links may include a display of one or more properties of the document. For example, as shown in FIG. 5, each of the links 94 to document$_1$, document$_2$, and document$_3$ is displayed on the web view page 72a along with the value for the property "P" for the document. The property "P" may be, for example, the author of the document, the importance of the document, the department, or the like. A web view page 72 may be utilized to display properties values without document links, if desired. Document links shown on a web view page may also be filtered, such as by a most-recently-used algorithm, a most-frequently-used algorithm, search criteria, and so forth.

To locate a document, a search page 98 (FIG. 7) may be provided through which the document library database 66 may be queried to locate documents with properties values matching a query. The search page 98 may utilize sort and/or filtering operations. The functions of the search page 98 may alternatively be provided via a dialog box, a search pane, or the like.

A template 100 (FIG. 5) may also be associated with each document library, via which new documents may be created. The template 100 may be accessed from various places, for example, via links on the interfaces of the network access software 62 or the content editing software 64, but is preferably is accessed via a shortcut 102 (FIG. 5) on a web view page 72 directed to the document library.

The template 100 is associated with a document library folder, and documents based on the template default to saving to the appropriate document library folder. If the document library folder has a properties form (such as the property form 82 described above) associated therewith, the form may be used to enter or alter properties values for each new document. The properties form may have default values for some or all of the properties based upon the document library that is associated with the template. Alternatively, default values may be set based upon default settings within the template itself. These values may override the default values of the document library.

As described above, each document library includes a properties set, and saving a document into a document library folder for a document library makes the document part of that library and therefore subject to that library's property set and rules. Thus, creating a document from a template that is associated with one document library and saving the document to a second document library makes the document subject to the second document library's property set and rules.

Figure 8:
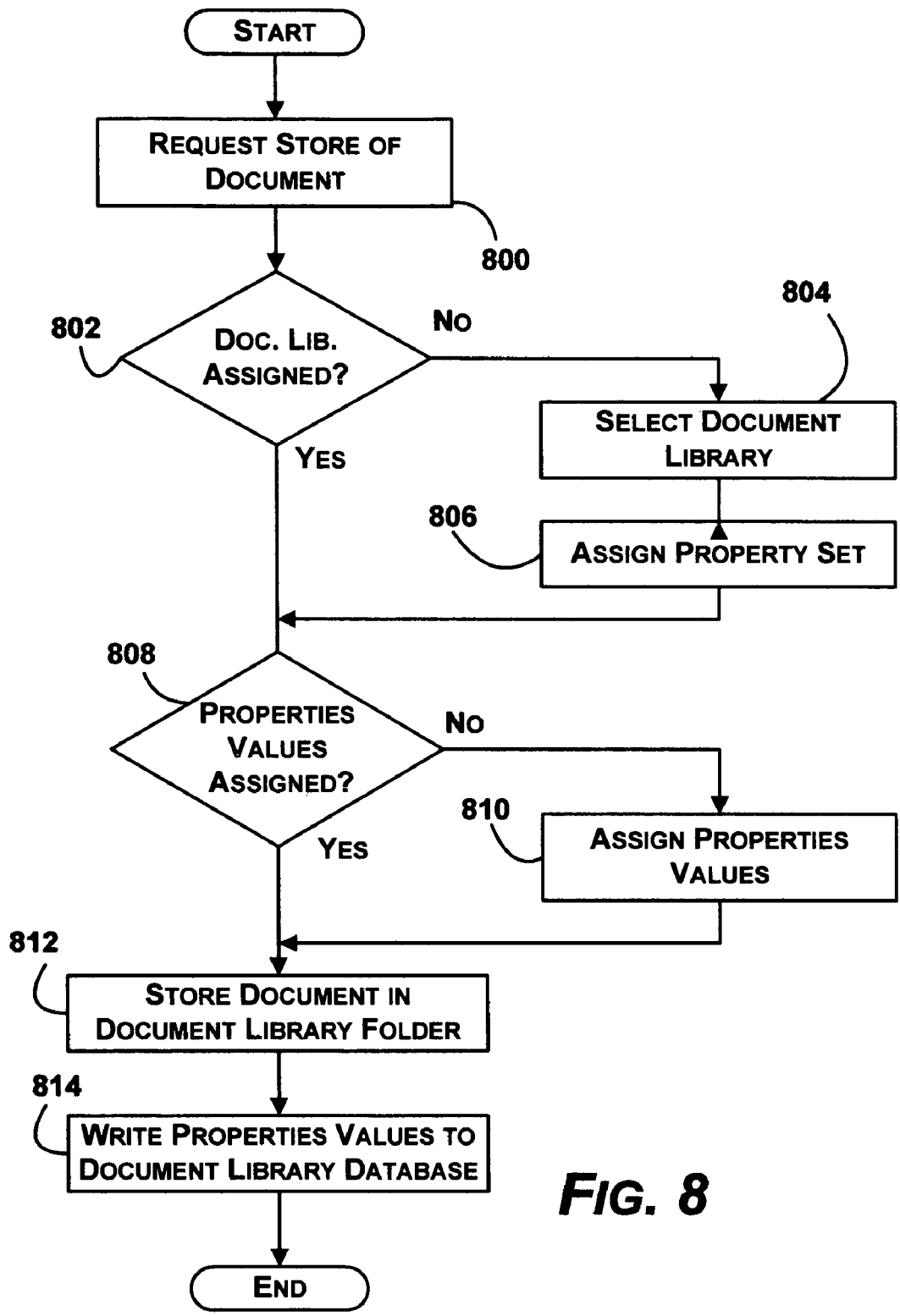
FIG. 8 is a flow diagram generally representing the steps for adding a document to a document library in accordance with one aspect of the present invention.

Turning now to an explanation of the operation of the present invention, FIG. 8 shows a general overview of a process for adding a document to a document library in accordance with one aspect of the present invention. Beginning at step 800, the user requests that a document be saved to a document library. The user may make the request from within the content editing software 64, for example by selecting a document library file system folder 68 in a "Save As" dialog box. As another example, the document may be saved after creation from a template 100 accessed via a web view page 72. Alternatively, an existing document may be uploaded from the user's machine to the website by using a web page form on the website (e.g., follow a link from the document library view page to the upload form). As still one more example, a document in one library folder may be saved or moved into another library folder. In addition, a stand-alone executable may be provided that is associated with a particular document library and to which a document may be dragged and dropped. The executable then performs the work of saving the document to the designated document library. The executable may be provided, for example, on a hand-held device as described above.

In any event, if the document is not yet associated with one of the document libraries, then step 802 branches to step 804 where a document library is selected for the document (e.g., via a user interface that displays representations of available document libraries from which the user selects an appropriate one). After the document library is selected, step 804 branches to step 806, where the property set for the document library is assigned to the document. If the document was moved from another document library, this may involve removing some properties and/or adding others. Step 806 then branches to step 808, where a determination is made if the properties values for the document have been assigned (as described below).

Figure 9:
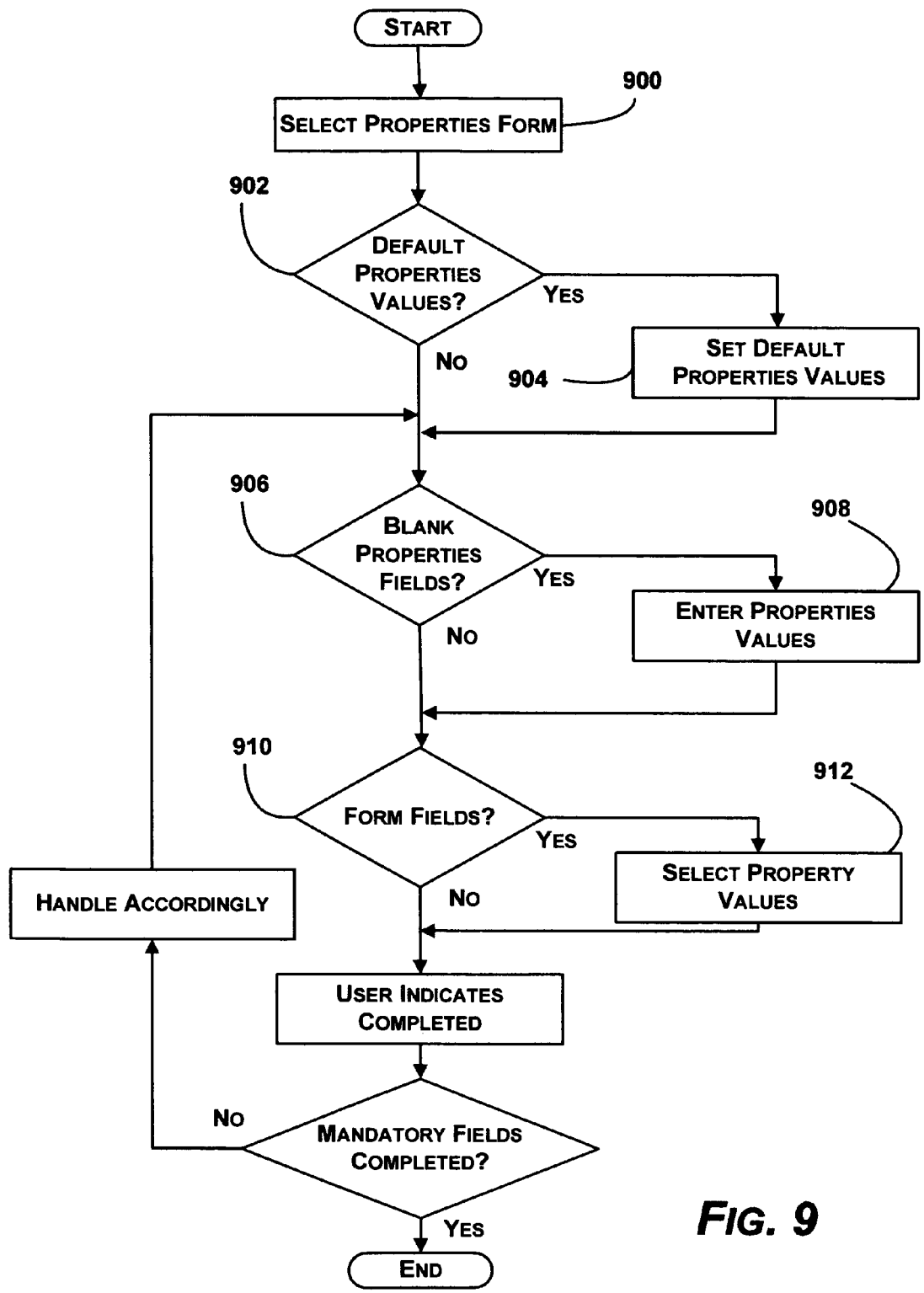
FIG. 9 is a flow diagram generally representing the steps for setting properties values for a document in accordance with one aspect of the present invention.

If, however, the document library has been assigned for the document, then step 802 branches directly to step 808 where the properties values for the document are assigned. In either event, at step 808 a determination is made as to whether the properties values have been set for the document 70. If not, step 808 branches to step 810 where properties values are assigned (FIG. 9). After properties values have been assigned, step 810 branches to step 812 where the document is saved to the document library file folder. The properties values are then written to the document library database 66 (step 814).

If the properties values were previously assigned, step 808 branches directly to step 812, where the properties values are written to the document library database. The document is then saved to the document library file folder (step 814).

FIG. 9 shows a general overview of a process for assigning properties values for a document in accordance with one aspect of the present invention. Beginning at step 900, a user selects the properties form 82. Selection may occur, for example, by clicking on a link to the properties form 82, by creating a new document via the template 100, or by requesting a save of a document. Adding an existing document to a document library file system folder may promote some property values for the document, but in one embodiment does not automatically display the properties form 82. Instead, the user clicks on an edit properties link (not shown) in the view page to access the properties form 82.

In any event, if there are default properties values (e.g., because of the particular document library chosen during a save command), then step 902 branches to step 904 where the default properties values are set. The process then branches to step 906, where a determination is made whether there are blank properties fields (discussed below).

If there are not properties values, then step 902 branches directly to step 906. If blank properties fields are present, then step 906 branches to step 908, where properties values may be entered. These properties may be mandatory or optional. The process then branches to step 910, where a determination is made as to whether there are form fields. If there are not blank properties fields, then step 906 branches to step 910.

If form fields are present, then step 910 branches to step 912, where a field may be selected from the available options. The user may also change default values, if allowed. It can be understood that the steps 906 to 912 may occur in any order, and, as an example, a user may fill some fields, select some property values, and/or change some default values as the user moves down a properties form 82. The user may or may not have left some entries blank or unselected.

In any event, the process branches to step 914, where the user indicates that he or she has completed the setting of the properties. If all mandatory fields have not been completed, then step 916 branches to step 918, where the fact that some fields need to be selected or values need to be entered is handled accordingly, e.g., by prompting the user to complete required fields, sending an error message, setting default values for unselected fields, or the like.

Figure 10:
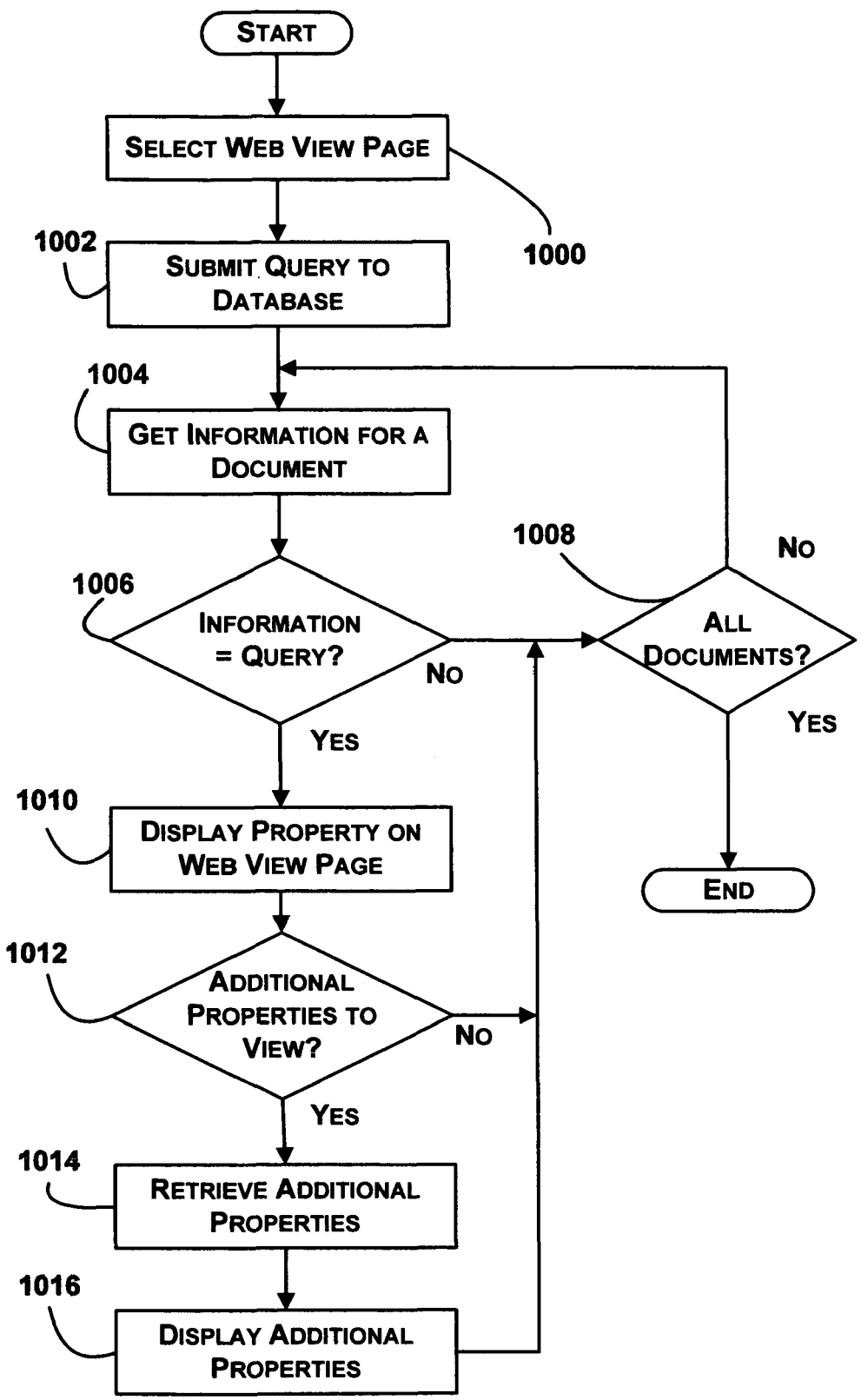
FIG. 10 is a flow diagram generally representing the steps for providing a view on a web view page in accordance with one aspect of the present invention.

FIG. 10 shows a general overview of a process for providing a view on a web view page 72 in accordance with one aspect of the present invention. Beginning at step 1000, a web view page 72 is selected (e.g., by clicking on a link to the web view page). The web view page 72 then submits a query to the document library database 66 (step 1002). Information, such as information 92 regarding document library association or properties values information, is then retrieved from the database for a document 70 (step 1004). If the information does not meet the query, then step 1006 branches to step 1008, where a determination is made whether information for all documents has been retrieved. If not, then step 1008 branches back to step 1004, where information is retrieved from the database for the next document. If the relevant information for all documents has been compared against the query, then the process ends.

If the information matches the query, then step 1006 branches to step 1010, where property information for the document is displayed on the web view page 72. This information may be a document link, a property value, or the like. Additional HTML formatting, such as table rows and the like, may be used for each document returned by the query. If additional properties for the document are to be displayed, then step 1012 branches to step 1014 where the additional properties are retrieved and then displayed (step 1016), and displaying the web view page is complete. The process then loops back to step 1008 to determine if all documents have been checked. Also, if there are no other properties to display for the document, then step 1012 loops back to step 1008, where additional documents are checked against the query, if relevant.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer system comprising:
    at least one processor for executing computer-executable instructions; and at least one computer-readable storage medium storing computer-executable instructions, which when executed by the at least one processor, cause the computing system to perform steps, comprising:
    receiving a document for storing in association with a selected document library file system folder, the selected document library file system folder is associated with a selected document library from among a plurality of document libraries, each document library among the plurality of document libraries comprising a document library database, a document library file system folder, and documents included within the document library file system folder, wherein each document library of the plurality of document libraries has a corresponding set of properties that apply to the type of documents that are associated with that document library;
    associating the set of properties corresponding to the selected document library with the document such that the document is associated with a consistent set of properties applied to all documents stored in association with the selected document library, and such that each document in the selected document library has the consistent set of properties that make such documents specific to only the selected document library;
    writing property value information for at least some of the properties in the set to the document library database of the selected document library that includes an entry for the document to relate the property value information to the document; and
    storing the document in the selected document library file system folder of the selected document library, such that the document and all other document stored in the selected document library file system folder have consistent properties making such documents specific to the selected document library in which the documents are all stored.

2. The computer system of claim 1 having further computer-executable instructions comprising, setting the property value information for the document.

3. The computer system of claim 2, having further computer-executable instructions comprising providing a properties form, wherein setting the property value information comprises setting the information via the properties form.

4. The computer system of claim 3 wherein the properties form is associated with the document library, and is provided to a user for setting the property value information for the document.

5. The computer system of claim 3 having further computer-executable instructions comprising creating the properties form via a query.

6. The computer system of claim 2, wherein at least some of the property value information is set to a default value that is set based upon a document library selected for the document.

7. The computer system of claim 6, wherein the default value is set based upon a template from which the document was created.

8. The computer system of claim 2 having further computer-executable instructions comprising providing a form field, wherein at least some of the property value information is chosen from the form field.

9. The computer system of claim 1 having further computer-executable instructions comprising, displaying a link to the document on a view page.

10. The computer system of claim 9, wherein displaying a link comprises providing a view page having a section bound by a query to the database, and displaying the link based upon matching of the query with the entry.

11. The computer system of claim 1 having further computer-executable instructions comprising, displaying at least some of the property value information on a view page based upon the entry for the document.

12. One or more computer readable storage media storing computer-executable instructions, which when executed by a processor comprising:
   searching the selected document library to locate documents having property information that matches the search criteria;
   receiving a document for storing in association with a selected document library file system folder, the selected document library file system folder is associated with a selected document library from among a plurality of document libraries, each document library among the plurality of document libraries comprising a document library database, a document library file system folder, and documents included within the document library file system folder, wherein each document library of the plurality of document libraries has a corresponding set of properties that apply to the type of documents that are associated with that document library;
   associating the set of properties corresponding to the selected document library with the document such that the document is associated with a consistent set of properties applied to all documents stored in association with the selected document library, and such that each document in the selected document library has the consistent set of properties that make such documents specific to only the selected document library;
   writing property value information for at least some of the properties in the set to the document library database of the selected document library that includes an entry for the document to relate the property value information to the document; and
   storing the document in the selected document library file system folder of the selected document library, such that the document and all other document stored in the selected document library file system folder have consistent properties making such documents specific to the selected document library in which the documents are all stored.

13. The one or more computer-readable media of claim 12 wherein receiving a document further comprises receiving corresponding property information for that document, and storing the document in the selected document library file system folder comprises storing the corresponding property information in the document library database that is contained within the document library such that the property information is related to the document.

14. The computer system of claim 13 wherein storing the corresponding property information in the document library database comprises creating an entry in the document library database for the document.

15. The computer-readable media of claim 12 further comprising:
   receiving a request to search the selected document library for documents having property information that matches search criteria;
   searching the selected document library to locate documents having property information that matches the search criteria; and
   in response to searching the selected document library, returning a result of the search.

16. The computer system of claim 15 wherein returning the result of the search comprises providing a view page having a link for each document that matched the search criteria, and wherein the view page further includes at least some of the property information for each document that matched the search criteria.

17. The computer system of claim 1 having further comprising computer-executable instructions that cause the computing system to write at least some of the properties in the set to the document in addition to the document library database.

* * * * *

UNITED STATES PATENT AND TRADEMARK OFFICE
CERTIFICATE OF CORRECTION

PATENT NO. : 7,743,082 B2 Page 1 of 1
APPLICATION NO. : 11/174265
DATED : June 22, 2010
INVENTOR(S) : Michael P. Arcuri et al.

It is certified that error appears in the above-identified patent and that said Letters Patent is hereby corrected as shown below:

In column 14, line 19, in Claim 14, delete "computer system" and insert
-- computer-readable media --, therefor.

In column 14, line 33, in Claim 16, delete "computer system" and insert
-- computer-readable media --, therefor.

Signed and Sealed this
First Day of February, 2011

David J. Kappos
*Director of the United States Patent and Trademark Office*